United States Patent Office 3,436,172
Patented Apr. 1, 1969

3,436,172
METHOD OF MAKING HYDRAZINIUM
DIPERCHLORATE
John E. Paustian, Whippany, Marvin M. Fein, Westfield, and Murray S. Cohen, Morristown, N.J., assignors to Thiokol Chemical Corporation, Bristol, Pa., a corporation of Delaware
No Drawing. Filed Apr. 3, 1962, Ser. No. 184,666
Int. Cl. C01b *11/18;* C01c *1/28;* C06c *1/02*
U.S. Cl. 23—85                                    4 Claims This invention relates to methods of making hydrazinium diperchlorate, and relates in particular to methods of making this material in anhydrous form, substantially free of hydrazinium monoperchlorate.

As disclosed in U.S. Patent 3,006,743, hydrazine diperchlorate ($HP_2$) is of utility as an oxidizer for combination with high energy fuels in the compounding of solid rocket propellants. As disclosed in the aforementioned patent, the $HP_2$ oxidizer is conveniently pulverized and admixed with a polymeric or pre-polymeric fuel component, and then cured to form the final propellant composition.

In compounding rocket propellants, it is desirable that hydrazine diperchlorate be employed in anhydrous form to maximize its oxidizing power per unit weight. It has now also been found that anhydrous hydrazine diperchlorate substantially free of hydrazine monoperchlorate has a higher density and a lower sensitivity to shock than does diperchlorate contaminated with the monoperchlorate salt. High density permits high loading levels in the propellant chamber of a rocket motor. Low sensitivity is of importance for safety in handling.

Further, it has been found that the production of the pure $HP_2$ salt in a particular crystal form is of advantage in compounding rocket propellant compositions. In particular, when the oxidizing salt is mixed with a liquid polymer fuel component prior to curing to form a solid propellant grain, the presence of the salt as crystals having a rounded form substantially free of irregular projections greatly facilitates the mixing of the oxidizer and fuel components to form a homogeneous mixture. If the crystals are irregular in shape, interference of the particles with each other, e.g. by frictional rubbing or by interlocking of their irregularities, causes great difficulty in dispersing the solids throughout the liquid component and has heretofore presented substantial manufacturing problems, since heavy duty apparatus capable of stirring the very viscous mixtures must be employed. Also, it is difficult to achieve homogeneity in such very viscous mixtures: undesirable voids and localized non-uniformities in composition may be present in the finished propellant, causing non-uniform burning on ignition. By using the $HP_2$ salt in the form of rounded crystals, according to the present invention, mixing of the oxidizer with the fuel component of the solid propellant being made is greatly facilitated without requirements for special apparatus or unusual limitations as to batch size.

According to the present invention, hydrated hydrazinium diperchlorate substantially free of monoperchlorate contamination in prepared by combining hydrazine and perchloric acid such that, critically, the perchloric acid is in excess of the 2:1 molar ratio stoichiometrically necessary for formation of the di-salt. Thus, the molar ratio of perchloric acid to hydrazine can range from about 2.05:1 to about 100:1 although it is desirable to keep the ratio to a minimum of 2.86:1 and to a maximum of about 5:1. By using at least the preferred minimum, stripping steps removing volatiles under vacuum can be avoided. By remaining below the preferred maximum, product recovery is simplified, since any excess perchloric acid must eventually be separated from the salt formed. Under these conditions, hydrated hydrazinium diperchlorate substantially free of the monoperchlorate salt, that is containing less than about one percent by weight of the mono-salt, can be prepared.

The reactants are conveniently admixed in the form of their aqueous solutions. The concentration of the solutions may vary over wide limits, for example from about 2% to about 65% by weight of hydrazine in water and from about 2% to about 73% by weight of perchloric acid in water. The use of more concentrated solutions is preferred, since this decreases the amount of water from which the solid salt phase must be separated. Also, the reagents are commonly commercially available in fairly concentrated form, e.g. about 54% hydrazine and about 70% perchloric acid.

The aqueous acid may be added to the aqueous hydrazine, or the hydrazine may be added to the acid. The reagents can be combined at any temperatures between the freezing point of the reactants (about −40° C.) to the reflux temperature of the mixture (about 100° C.). In view of the explosion hazard involved, it is preferred to operate at low temperatures, and, to avoid the expenses inherent in refrigeration, it is convenient to carry out the reaction at room temperatures.

After combination of the reactants, the hydrated $HP_2$ salt can be recovered by evaporation of the aqueous phase. The evaporation may take place at temperatures above room temperature, or can be accomplished at room temperature or below. Within the lower temperature ranges, the rate of evaporation of the aqueous phase can be increased by the use of reduced pressures. In removal of the aqueous phase, excess perchloric acid is largely removed from the reaction mixture in the form of an azeotropic mixture with water.

Evaporation may be continued until substantial quantities of crystals are deposited from the solution, in which case the hydrated $HP_2$ crystals are recovered by filtration. In this procedure, the hydrated salt is then dried to remove the water of hydration and to produce the anhydrous salt. The temperatures and pressures for drying the hydrated salt may vary from room temperature and pressure to elevated temperatures as high as 100° C. Similarly, the pressure above the salt may be reduced to subatmospheric values, e.g. to 0.5 mm. of Hg. to speed the removal of water from the salt.

In an alternative recovery step, crystals of the hydrated salt need not be removed by filtration from the aqueous phase, but evaporation of the reaction mixture is continued at the temperatures and pressures specified earlier until the aqueous phase has substantially all disappeared. In this embodiment, heating of the remaining salt can then be continued until dehydration occurs. In either this one step process, or in the two step process involving filtration described above, a period of from 8 to 24 hours at temperatures between about 55° C. and about 80° C. at pressures of 0.5 to 7 mm. Hg is sufficient for dehydration of the hydrated $HP_2$ salt.

The anhydrous salt obtained by the aforementioned dehydration treatment is highly fractured with sharp edges and points. As mentioned earlier, crystals of this form are less desirable in compounding solid propellants having a high oxidizer loading because of the extremely high viscosity of the mixtures resulting when the crystals are combined with a liquid polymeric fuel component prior to curing to form a solid propellant.

It has been discovered that these irregularly shaped crystals can be modified to give materials of more regular shape, e.g. often approaching a spheroidal shape. These more uniform crystals can be employed in compounding propellant mixtures containing solids loadings as high as 85% without encountering such tremendous viscosities as make processing infeasible. To modify the crystal shape according to the present invention, crystals of the anhydrous "fractured" or irregular $HP_2$ material are contacted with aqueous perchloric acid of a concentration of at least 70% by weight, conveniently at room temperature. The contact may be made with or without agitation. Agitation may tend to give smaller particles under conditions for which mechanical attrition can occur, but does not otherwise significantly affect the development of a generally rounded shape in the particles.

The temperature of the perchloric acid during the treatment may be as high as 50° C., although this does not appear to have any advantages for the process. Similarly, the time of treatment may vary from an hour or two hours to as much as two or three days, but extended periods of contact do not appear to afford advantages not obtained in a treatment having a duration of about six hours, for example.

The crystal rounding treatment just described differs significantly from conventional crystal digestion processes. In conventional crystal digestion techniques, smaller crystals are preferentially dissolved and the dissolved material reprecipitates on larger crystals in equilibrium with the supernatant liquid. However, in such digestion processes, the form of the large crystals, growing at the expense of the smaller crystals, retains the crystal habit peculiar to the salt involved. Thus, material freshly deposited from solution in a conventional digestion process deposits on crystalline materials already present to propagate the crystal form inherent in the material. However, in the process of the present invention, visible or gross crystalline form substantially disappears in the treated material, with formation of solid materials having visibly smooth surfaces, highly resembling glassy beads under the microscope. If preferential solution and reprecipitation are part of the process of the invention, they lead to unexpected and surprising results.

In still another important embodiment of the invention, hydrated $HP_2$ is dehydrated and converted to the convenient smooth crystalline form desirable when the material is used in compounding solid rocket propellants by a one step process in which the water of hydration present is removed from the system in the form of azeotropes with various organic and inorganic materials. In addition to eliminating separate dehydration and crystal-forming steps, this embodiment obviates low pressure operations, thus giving increased convenience and savings in processing.

According to this embodiment, a hydrated $HP_2$ salt, or an aqueous solution containing the salt in the substantial absence of hydrazinium monoperchlorate, is combined with a volatile azeotropic agent chemically inert to the salt. The azeotropic agent is of a kind, and is present in such amounts, that the boiling point of its mixture with water is at least 70° C., preferably at least 80° C., at atmospheric pressure. These temperatures assure that the equilibrium decomposition $$HP_2 \cdot 2H_2O \rightarrow HP_2 + 2H_2O$$

is sufficiently far to the right that efficient removal of water occurs.

Benzene, having a boiling point of 80° C., is a suitable azeotropic agent, for example. Since a constant boiling mixture, boiling at 69.25° C. is formed with water at 8.83 weight percent of water, it is preferred to use amounts of benzene in excess of those present in the constant boiling mixture. This shifts the boiling point of the mixture to higher temperatures approaching the boiling point of pure benzene. As noted earlier, such higher temperatures promote more efficient decomposition of the hydrated salt.

Trichloroethylene is a particularly good azeotropic agent. It has a boiling point of about 86° C., and even its constant boiling mixture with water (5.4 weight percent $H_2O$) boils at 73.6° C., above the temperature at which the hydrated salt decomposes significantly.

Similarly, even such a low boiling material as hydrogen chloride (B.P.—80° C.) can be used in the present invention, since mixtures of HCl with water having boiling points above 70°–80° C. can be formed. For example, a constant boiling mixture containing 20.2 weight percent HCl boils at 108.6° C. at 760 mm.

The azeotropic agents may be organic substances such as benzene, cyclohexane, n-heptane, trichloroethylene, 1,2-dichloroethane, chlorobenzene, and certain fluorinated and fluorochlorinated aliphatic hydrocarbons (such as the "Freons" and "Genetrons"), e.g. $CCl_2F$—$CCl_2F$ and $CCl_3$—$CClF_2$. Similarly, inorganic materials forming azeotropes with water may be employed, hydrochloric and perchloric acids being examples of such a material.

Numerous inorganic and organic materials forming binary azeotropes with water, and mixtures of which was water will have a boiling point above about 70° C., are listed in the ACS monograph "Azeotropic Data," American Chemical Society, Washington, D.C. (1952). The tabular data in this reference are specifically incorporated by reference into this specification. Agents forming binary azeotropic mixtures with water, which mixtures boil at temperatures below 70° C. at 760 mm., can also be employed by applying elevated pressures raising the boiling point of the mixtures above 70°–80° C.

As mentioned earlier, the crystalline dehydrated products prepared according to this embodiment have a rounded form preferred for use in compounding rocket propellants, without the necessity for separate additional crystal treating steps.

A better understanding of the invention and of its many advantages will be had by referring to the following examples given by way of illustration.

EXAMPLE 1

Substantially pure hydrated hydrazinium diperchlorate was prepared by adding 11.7 parts by weight of 54.4% aqueous hydrazine to 114.0 parts by weight of 50.5% aqueous perchloric acid ($HClO_4/N_2H_4$=2.9). To the mixture, in which the $HP_2$ product was in solution, were added 95.0 parts by weight of 71% perchloric acid. On cooling to 0° C., 56.4 parts of salt precipitated from the solution (about 90% yield). The salt was filtered from the mother liquor and analyzed as 75.0% $HP_2$, 7.4% $HClO_4$, balance water and less than 1% of HP. The mother liquor, which contained about 50% $HClO_4$ was recycled to neutralize further hydrazine.

Two portions of the wet salt, each 20 parts by weight, were dried in vacuo for about 9½ hours at 56° C. Each sample lost 4.9 parts by weight on drying. Analysis of the dried samples gave the following results:

| Sample | Percent $HP_2$ | Percent HP |
|---|---|---|
| I | 99.29 | 0.93 |
| II | 99.56 | 0.73 |

EXAMPLE 2

Substantially pure hydrated hydrazinium diperchlorate, containing less than about one percent of hydrazinium monoperchlorate, was prepared by adding 184.0 grams of a 43.8% solution of perchloric acid (0.81 mole) to a beaker and cooling to below 10° C. 100 grams of a 12% solution of hydrazine (0.39 mole) was added with stirring at a rate such that the temperature of the mixture remained below 30° C. The solution was stripped under vacuum at room temperatures. The resulting solid was divided into four portions, which were separately dried at about 56° C. under a vacuum of 1.7 mm./Hg, to yield a total of about 75.7 grams of anhydrous crystals. Analysis of the four samples for the ratio $HP_2$:HP were as follows: 99.0/0.9; 99.0/1.2; 99.5/0.4; and 99.3/0.7 The melting points of the samples were greater than 210° C

EXAMPLE 3

Substantially pure $HP_2$ was prepared by cooling 39.35 grams of a 43.8% solution of perchloric acid (0.172 mole) to 8° C. and slowly adding 14.95 grams of a 12.4% solution of hydrazine (0.058 mol) with stirring. The solution was stripped at room temperature under vacuum with precipitation of solids. The resulting two phase mixture containing a weight ratio of solids to liquids of about 2:1 was then filtered. The solid phase was analyzed and shown to contain 74.5% hydrazinium diperchlorate and 7.3% perchloric acid. After additional drying for 1.5 hours at 56° C. and 0.15 mm./Hg, the solid was found to contain 99.6% hydrazinium diperchlorate and 0.4% of hydrazinium monoperchlorate. The weight of anhydrous solid recovered was in excess of 9.71 grams, corresponding with a yield of about 90.4%. Additional product could be recovered from the mother liquor by recycling.

The materials formed in the processes of Examples 2 and 3 have melting points, with decompositions, at temperatures above 210° C. The materials are not sensitive to detonation by a 2 kilogram weight dropped from a height of 6.5–7 inches. The solids, which have a density of about 2.19 grams per cc. immediately hydrate on dissolving in water to give a mixture equivalent to a mixture of perchloric acid and hydrazinium monoperchlorate. Titration of the resulting solution with a base gives two inflection points, corresponding to the concentrations of $H_3O^+$ and $N_2H_5^+$ respectively, at a pH of 4.8 and 9.7, respectively.

EXAMPLE 4

Anhydrous crystals prepared according to the methods of Examples 2 and 3 and having a fractured, irregular form were charged to 6-dram glass screw cap vials along with 2.5 ml. of 70–72% aqueous perchloric acid. Some of the samples were stirred at room temperture and at 50° C. for periods of 6 hours and 18 hours, and other unstirred samples were left at corresponding temperatures for corresponding periods of time, as well as at room temperature for 48 hours and at 50° for 48 hours.

After this treatment, the crystals were examined microscopically and were found to be rounded, some almost spheroidal. The crystals obtained under varying conditions of temperature and time of treatment were all substantially similar, showing the same rounded form. Crystals from the unstirred vials had an average diameter of about 100–200 microns, whereas those from the stirred vial were about 20–30 microns in diameter. The difference in crystal size may be due to mechanical attrition under the conditions of stirring.

EXAMPLE 5

Anhydrous crystals of $HP_2$ having a rounded form were prepared directly from hydrated $HP_2$ prepared according to Examples 2 and 3 by charging a 100 ml. flask equipped with a stirrer and a Dean-Stark assembly with a 10 gram sample of hydrated $HP_2$ and 142 grams of trichloroethylene. The hydrated salt, which contained 73.03% $HP_2$, 7.89% perchloric acid, and 19.08% water (by difference), was converted to an anhydrous material containing 99.3% $HP_2$ and 0.4% of monoperchlorate by heating the flask until 70 ml. of a trichloroethylene-water azeotrope had been collected in the Dean-Stark trap. The remaining contents of the flask were cooled and filtered, and the resulting solid was then dried for two additional hours to remove excess trichloroethylene.

EXAMPLE 6

A 6 gram sample of hydrated $HP_2$ (73.03% $HP_2$, 7.89% perchloric, acid, balance water) and 85 ml. of benzene were treated as in Example 5, until 70 ml. of benzene-water had been collected in the Dean-Stark assembly, where two liquid phases were present. The contents remaining in the flask were then cooled to room temperature and filtered, and the solid dried in vacuo. Analysis showed the presence of 90.2% $HP_2$, 2.4% perchloric acid, the balance being removable benzene.

The experiment was repeated twice with 1,2-dichloroethane and chlorobenzene as azeotropic agents to give wet salt products having an $HP_2$ analysis of 94.9% and 94.6%, respectively.

Cyclohexane, n-heptane, $CCl_2F$—$CCl_2F$, $CCl_3$—$CClF_2$, and other azeotropic agents giving mixtures with water boiling above about 70° C., are also suitably employed in similar dehydrating techniques.

What is claimed is:

1. The method of modifying the form of irregular crystals of anhydrous hydrazinium diperchlorate to make the crystals more regular which comprises contacting said crystals with aqueous perchloric acid of a concentration of at least 70 percent by weight.

2. The method of making formed crystals of anhydrous hydrazinium diperchlorate substantially free of hydrazinium monoperchlorate which comprises contacting one molar part of aqueous hydrazine with more than two molar parts of aqueous perchloric acid, recovering crystals of hydrated hydrazinium diperchlorate from the resulting mixture by removal from liquid components of the reaction mixture, dehydrating said hydrated hydrazinium diperchlorate to form crystals of anhydrous hydrazinium diperchlorate, and making the form of the crystals of the anhydrous salt more regular by contacting the crystals with aqueous perchloric acid.

3. The method of making formed crystals of anhydrous hydrazinium diperchlorate substantially free of hydrazinium monoperchlorate which comprises contacting one molar part of aqueous hydrazine with more than two molar parts of aqueous perchloric acid, evaporating liquid components of the reaction mixture to form crystals of hydrated hydrazinium diperchlorate, dehydrating said crystals at temperatures above room temperature and at sub-atmospheric pressure to form crystals of anhydrous hydrazinium diperchlorate, and making the form of the crystals of the anhydrous salt more regular by contacting the crystals with aqueous perchloric acid having a concentration of at least 70% by weight.

4. The method of making formed crystals of anhydrous hydrazinium diperchlorate substantially free of hydrazinium monoperchlorate which comprises contacting one molar part of aqueous hydrazine with more than two molar parts of aqueous perchloric acid, removing water present in the reaction mixture by adding an azeotroping agent for water thereto, distilling off a mixture of water and said agent at a normal boiling point of at least 70° C., recovering crystals of anhydrous hydrazinium perchlorate from the remaining reaction mixture, and making the form of the crystals of the anhydrous salt more regular by contacting the crystals with aqueous perchloric acid.

References Cited

UNITED STATES PATENTS 3,131,997   5/1964   Stern _____ 23—190

OTHER REFERENCES

Audrieth et al., "The Chemistry of Hydrazine" (1951), pp. 167–169.

Turrentine, Journal of Am. Chem. Soc., vol. 37, pp. 1122–1125 (1915).

Gilbert, Journal of Am. Chem. Soc., vol. 53, pp. 3956, 3957 (1931).

Mellor, "A Comprehensive Treatise on Inorganic and Theoretical Chemistry," vol. 2, p. 395 (1947).

LELAND A. SEBASTIAN, Primary Examiner.

M. J. McGREAL, Assistant Examiner.

U.S. Cl. X.R.

23—190; 149—36